United States Patent

Sato

[11] Patent Number: 5,524,313
[45] Date of Patent: Jun. 11, 1996

[54] DISK CLEANER APPARATUS

[76] Inventor: Takashi Sato, C/O 19, 5-ban, 3-chome, Imai, Ohme-shi, Tokyo, Japan

[21] Appl. No.: 297,238

[22] Filed: Aug. 29, 1994

[30] Foreign Application Priority Data

Aug. 31, 1993 [JP] Japan .................... 5-239111

[51] Int. Cl.⁶ .................... G11B 3/58; B08B 11/02
[52] U.S. Cl. .................... 15/88.3; 15/97.1; 15/DIG. 14; 369/72
[58] Field of Search .................... 15/88.2, 88.3, 15/88.4, 74, 102, 21.1, DIG. 14, 230.14, 97.1; 360/128, 137 B; 369/71, 72

[56] References Cited

U.S. PATENT DOCUMENTS

| | | | |
|---|---|---|---|
| 1,473,765 | 11/1923 | Hanrath | 15/230.14 |
| 2,198,283 | 4/1940 | Hall | 15/230.14 |
| 2,986,849 | 6/1961 | Clark | 15/88.3 |
| 3,360,029 | 2/1972 | Zildjian | 15/88.3 |
| 3,748,677 | 7/1973 | Frank et al. | 15/88.3 |
| 4,024,596 | 5/1977 | Riouy | 15/88.3 |
| 4,199,150 | 4/1980 | Chung | 15/88.3 |
| 4,202,071 | 5/1980 | Scharpf | 15/88.3 |
| 4,561,142 | 12/1985 | Mischenko et al. | 15/88.2 |
| 5,144,711 | 9/1992 | Gill, Jr. | 15/88.2 |
| 5,282,289 | 2/1994 | Hasegawa et al. | 15/88.2 |

Primary Examiner—David Scherbel
Assistant Examiner—Tony G. Soohoo
Attorney, Agent, or Firm—Mc Glew and Tuttle

[57] ABSTRACT

A cleaner apparatus by which flaws or dust on the surface of a disk can be removed readily to prevent otherwise possible disorder in audio or video signals to be reproduced from the disk to allow utilization of the disk for a long interval of time is provided. The cleaner apparatus comprises an arm 1 for removably holding a disk 5 for rotation thereon, a dust or flaw removing rotary member 2 having a cylindrical peripheral face for being resiliently contacted with the surface of the disk 5, and a driving source 3 for driving the rotary member 2 to rotate around an axis of the same.

12 Claims, 4 Drawing Sheets

DISK CLEANER APPARATUS

FIELD OF THE INVENTION

This invention relates to a cleaner apparatus for removing flaws or dust, and more particularly to a cleaner apparatus for use for removing flaws or dust on the surface of an optical disk such as a laser disk or a compact disk.

BACKGROUND OF THE INVENTION

In recent year, optical disks such as laser disks or compact disks are used universally as a recording medium for audio or video signals. When a disk is to be stored or utilized, it is required to maintain the surface of the disk flat and to prevent the surface of the disk from being damaged or prevent dust or some other foreign articles from sticking to the surface of the disk.

Accordingly, when it is tried to insert a disk such as a laser disk into an accommodation case to store it or to set a disk in position into a deck for reproduction to utilize it, not only the disk must not be bent or curved, but also it is necessary to remove flaws formed on the surface of the disk or to remove dust sticking to the surface of the disk.

By the way, removal of flaws or dust on the surface of a disk such as a laser disk is conventionally performed by manual operation using cloth or some other suitable article. Since such operation requires much time and is cumbersome, satisfactory removal of flaws or dust is not performed.

If a disk is utilized while flaws remain on the surface thereof or dust remains sticking to the surface thereof, then it sometimes occurs that information read once is read again or information at a location is skipped and information at a next location is read. As a result, audio or video signals reproduced are disordered, and in the worst case, reproduction itself becomes impossible.

SUMMARY OF THE INVENTION

It is an object of the present invention to provide a cleaner apparatus by which flaws or dust on the surface of a disk such as a laser disk or a compact disk can be removed readily to prevent otherwise possible disorder in audio or video signals to be reproduced from the disk to allow utilization of the disk for a long interval of time.

In order to attain the object described above, according to the present invention, there is provided a cleaner apparatus, which comprises an arm for removably holding a disk for rotation thereon, a dust or flaw removing rotary member having a cylindrical peripheral face for being resiliently contacted with the surface of the disk, and a driving source for driving the rotary member to rotate around an axis of the same.

Preferably, the rotary member is disposed at an eccentric position displaced from the center line of the disk, and the arm holds the disk horizontally thereon and is formed for rocking motion in the direction of rotation of the rotary member. Preferably, the rotary member is formed in a cylindrical profile from fiber members, and a drive shaft connected to the driving source is removably fitted in an axial core portion of the rotary member. Preferably, a plurality of such rotary members are disposed such that they hold the disk from the opposite face sides therebetween.

With the cleaner apparatus of the construction, if the arm is rocked, then it becomes possible to mount or dismount a disk onto or from the arm, or it becomes possible to bring the rotary member into or out of resilient contact with the surface of the disk.

If the driving source is energized while the rotary member remains in resilient contact with the surface of the disk, then the rotary member is rotated around its axis so that the cylindrical peripheral face thereof which serves as a wiping out face wipes out the surface of the disk.

Thereupon, dust sticking to the surface of the disk or flaws formed on the surface of the disk are removed, and the disk is compulsorily rotated by the rotation of the rotary member.

Accordingly, if the length of the rotary member is set greater than the information recording width of the disk and the arm is successively rocked over a small angle during cleaning, removal of dust or flaws on the surface of the disk can be performed uniformly together with rotation of the disk.

Where a plurality of such rotary members are provided, that is, where the disk is held from the opposite face sides thereof by and between two rotary members, removal of dust or flaws on the opposite faces of the disk is performed at a time.

Further, by disposing a suitable polishing member between the cylindrical peripheral face of the rotary member and the surface of the disk or by changing the material of the rotary member, flaws on the surface of the disk can be removed well by polishing of the polishing member.

The dust removing member rotary member is replaced when it becomes soiled or abraded and cannot exhibit a predetermined wiping out function thereof any more.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
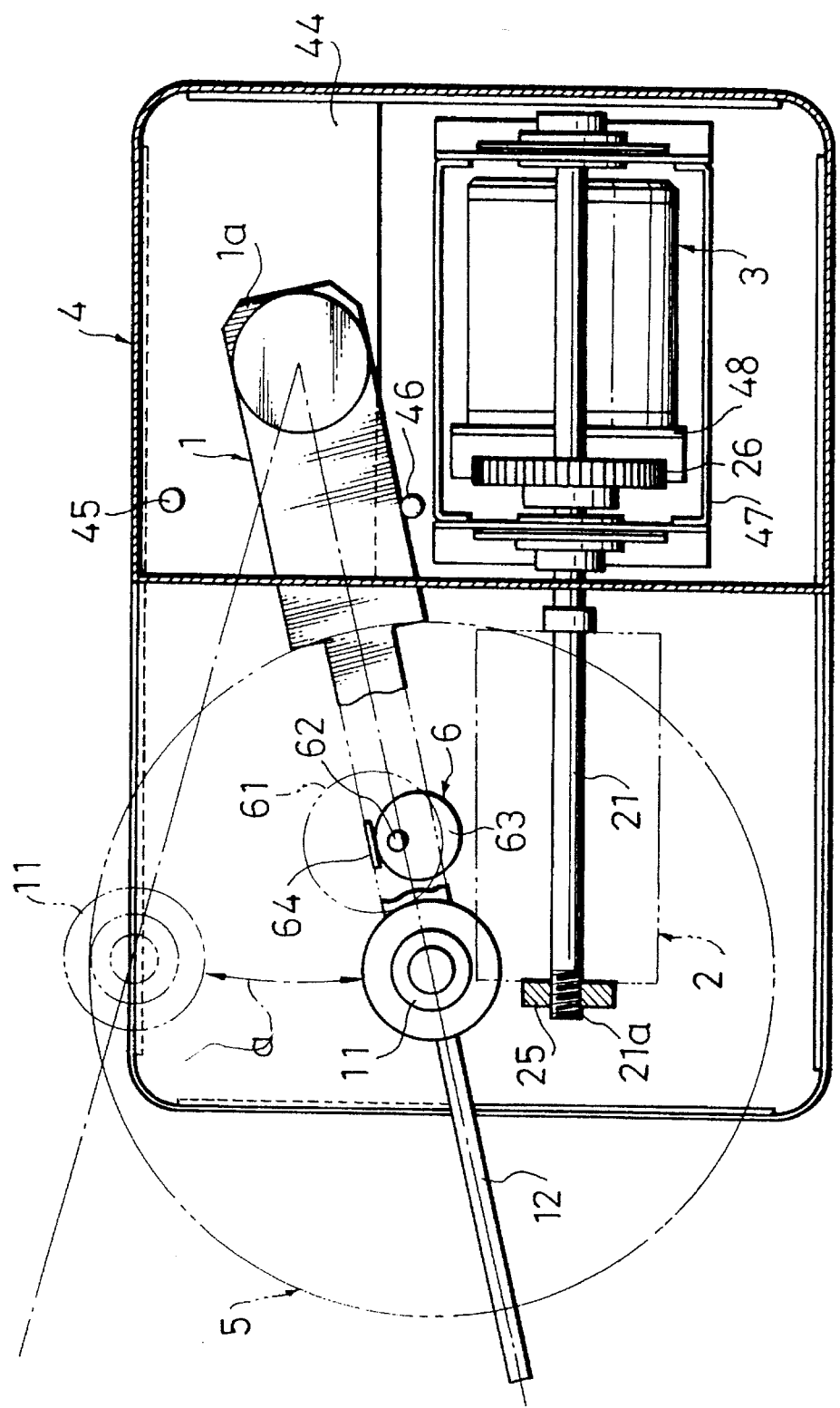
FIG. 1 is a plan view of a cleaner apparatus showing a preferred embodiment of the present invention with an upper end portion of a casing removed.
Figure 2:
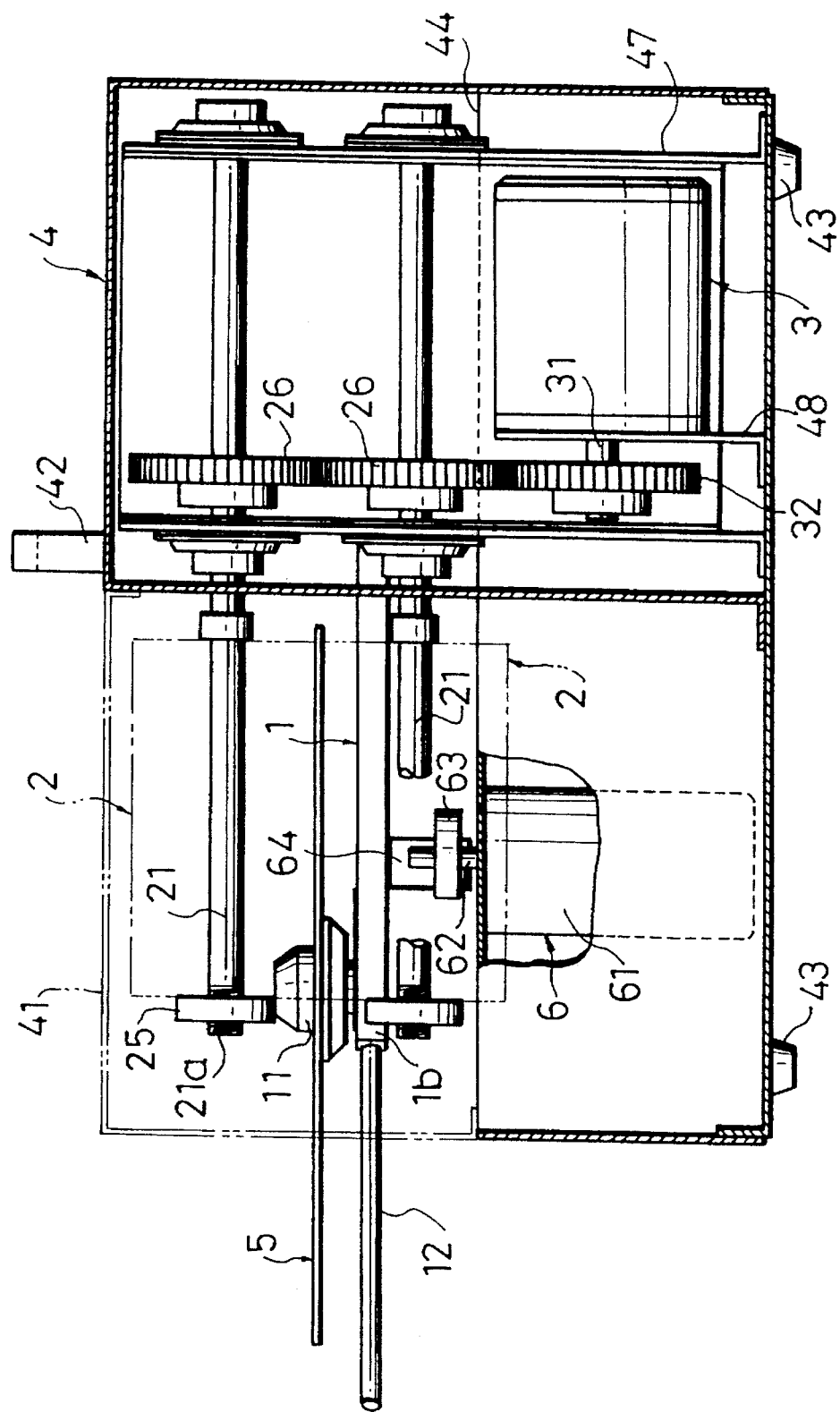
FIG. 2 is a front elevational view showing the cleaner apparatus of FIG. 1 with a front portion of the casing removed.

A cleaner apparatus according to the present invention is constructed as an apparatus for removing dust or flaws on the surface of a disk and is shown in FIGS. 1 and 2. Referring to FIGS. 1 and 2, the cleaner apparatus shown includes an arm 1, a dust or flaw removing member 2, also known as a cleaning member, in the form of a rotary member, and a driving source 3. A base end portion of the arm 1 which is shown on the right side in FIGS. 1 and 2 and the driving source 3 are accommodated in a casing 4 formed in a suitable configuration, and a free end portion of the arm 1 which is shown on the left side in FIGS. 1 and 2 and the dust or flaw removing member 2 are disposed outwardly of the casing 4.

It is to be noted that the free end portion of the arm 1 and the dust or flaw removing member 2 may otherwise be covered with a lid member 41 which is removably attached to the casing 4 as indicated by alternate long and two short dashes lines in FIG. 2.

Incidentally, in the present embodiment, the cleaner apparatus is set so as to be constructed as a unit, and accordingly, a handle 42 is disposed at the top of the casing 4 and leg members 43 are disposed at the four corners of the bottom of the casing 4 as seen from FIG. 2.

The arm 1 is formed so as to removably hold an optical disk such as a laser disk or a compact disk for rotation thereon and is set, in the embodiment shown, so as to hold a laser disk 5 horizontally.

The arm 1 is mounted at a base end 1a (refer to FIG. 1) thereof for pivotal motion on a stepped portion 44 formed in a so-called raised bottom on the casing 4 so that the free end portion thereof can be rocked in the direction of rotation of the dust or flaw removing member 2 as indicated by a double-sided arrow mark a of a phantom line in FIG. 1.

The range of the rocking motion of the arm 1 may be restricted by arbitrary means. In the embodiment shown, it is restricted by a stopper structure including a pin 45 mounted uprightly on the stepped portion 44 and another pin 46 disposed in a suitably spaced relationship from the pin 45.

The pin 46 is disposed essentially in order to prevent unnecessary rocking motion of the arm 1, but the pin 45 may be omitted in some cases.

It is to be noted that, though not shown, the casing 4 has an opening formed horizontally therein, and the base end portion of the arm 1 extends through the opening so that rocking motion of the arm 1 in the directions indicated by the arrow mark a may be allowed within the opening.

The arm 1 has a holder 11 at the free end 1b thereof (refer to FIG. 2). The holder 11 is formed so as to be fitted in a center opening 5a (refer to FIG. 3) of the laser disk 5 and support the laser disk 5 from the lower face side.

The holder 11 is supported for rotation at the free end 1b of the arm 1 by way of a bearing or the like not shown so that it can rotate freely.

The arm 1 further has an operation lever 12 provided at the free end 1b thereof and extending by a suitable length in an axial direction of the arm 1.

Therefore, when the arm 1 is rocked in its opening direction (clockwise direction in FIG. 1) by an external force to the operation lever 12 to position the holder 11 outside the casing 4, the laser disk 5 can be placed onto the holder 11.

On the other hand, when the arm 1 is rocked in its closing direction (counterclockwise direction in FIG. 1) by an external force to the operation lever 12 while the laser disk 5 is held on the holder 11, the dust or flaw removing member 2 can be contacted with the surface of the laser disk 5. In this instance, the dust or flaw removing member 2 is positioned at an eccentric position displaced from the center line of the laser disk 5 as indicated by an alternate long and two short dashes line in FIG. 1.

The dust or flaw removing member 2 is formed such that it has a cylindrical peripheral face serving as a wiping out face, and is set so that the cylindrical peripheral face thereof may be resiliently contacted with the surface of the laser disk 5 held on the arm 1.

Accordingly, when the dust or flaw removing member 2 is moved, that is, rotated, on the surface of the laser disk 5 while it is in resilient contact with the surface of the laser disk 5, it rubs the surface of the laser disk 5, and accordingly, the dust or flaw removing member 2 performs a dust wiping out operation or a flaw polishing operation. Here, preferably the material of the dust or flaw removing member 2 is selected depending upon whether it is used for removal of dust or for removal of flaws.

In the following, removal of dust by the cleaner apparatus of the present embodiment will be described in detail.

Figure 3:
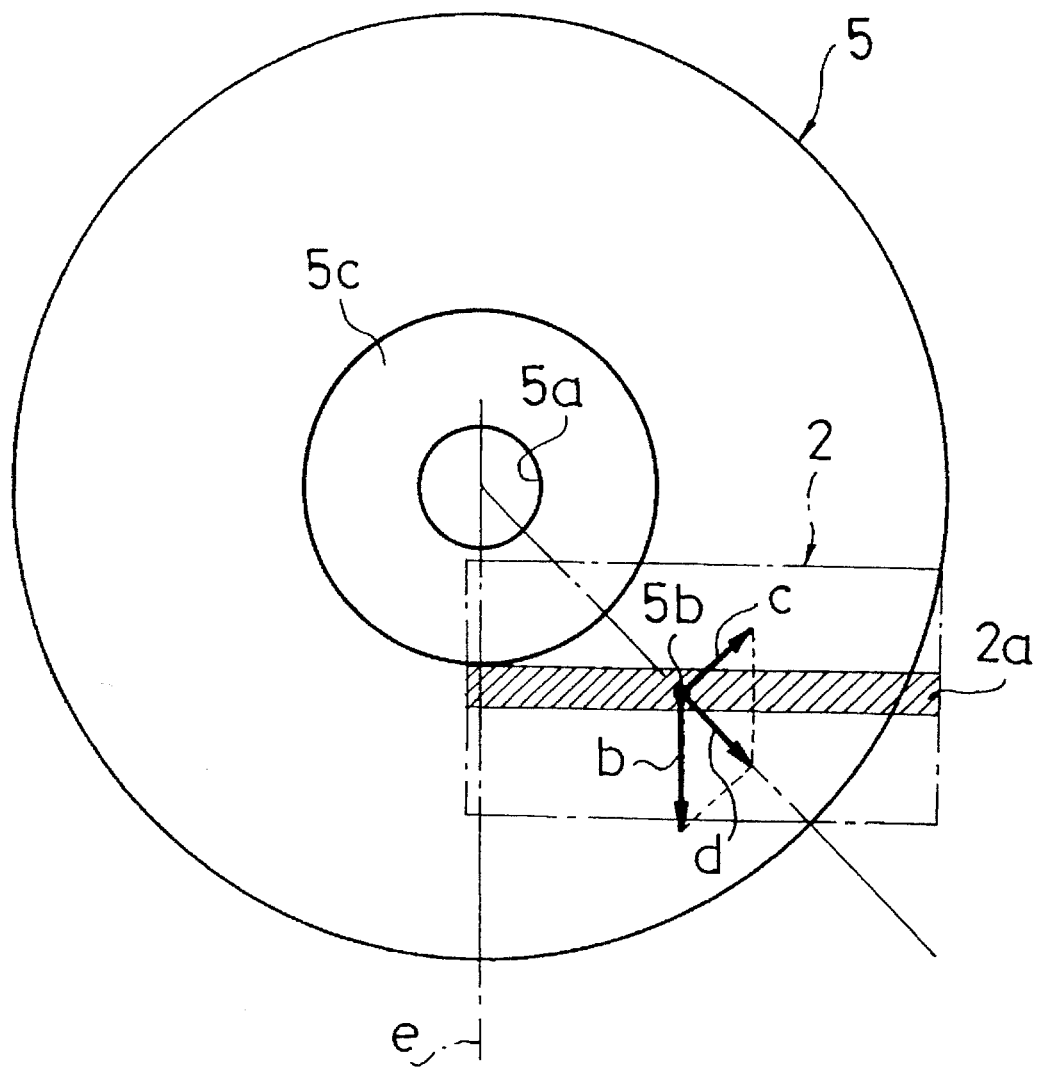
FIG. 3 is a diagrammatic view illustrating a contacting condition between a laser disk and a dust removing member in principle.

When the cylindrical peripheral face of the dust or flaw removing member 2 is resiliently contacted with the surface of the laser disk 5, the contacting portion 2a thereof presents a belt-like form having a suitable width as shown in FIG. 3 (refer to a portion indicated by slanting lines in FIG. 3).

Meanwhile, the wiping out direction of the dust or flaw removing member 2 at an arbitrary point 5b of the surface of the laser disk 5 within the area of the contacting portion 2a is a resultant force direction d of the direction b of rotation of the dust or flaw removing member 2 and the direction c of movement of the laser disk 5 caused by rotation of the dust or flaw removing member 2.

The resultant force direction d coincides with a radial direction of the laser disk 5, and accordingly, even if a wiping out mark should remain on the surface of the laser disk 5, the direction of the wiping out mark coincides with the arrangement direction of a head (not shown) of a deck for reproduction and will not make an obstacle to the head.

Figure 5:
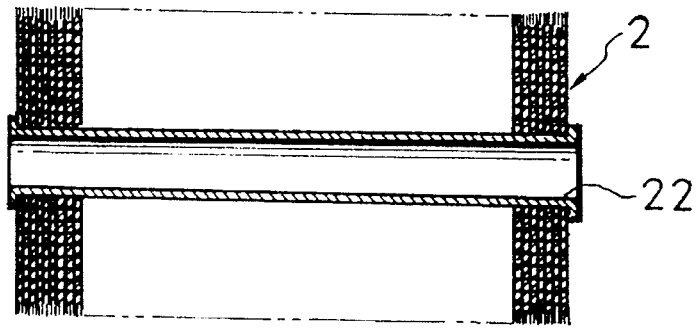
FIG. 5 is a longitudinal sectional view showing another example of rotary member.

It is to be noted that, when the cylindrical peripheral face of the dust or flaw removing member 2 is resiliently contacted with the surface of the laser disk 5, an end of the contacting portion 2a of the dust or flaw removing member 2, which is the left end in FIG. 3, is preferably positioned so that it does not contact with a label 5c adhered to the surface of the laser disk 5 as seen in FIG. 5.

Further, in this instance, the end of the contacting portion 2a which is the left end in FIG. 3 is preferably positioned such that it projects a little farther than the center line e of the laser disk 5 as seen from FIG. 3.

Figure 4:
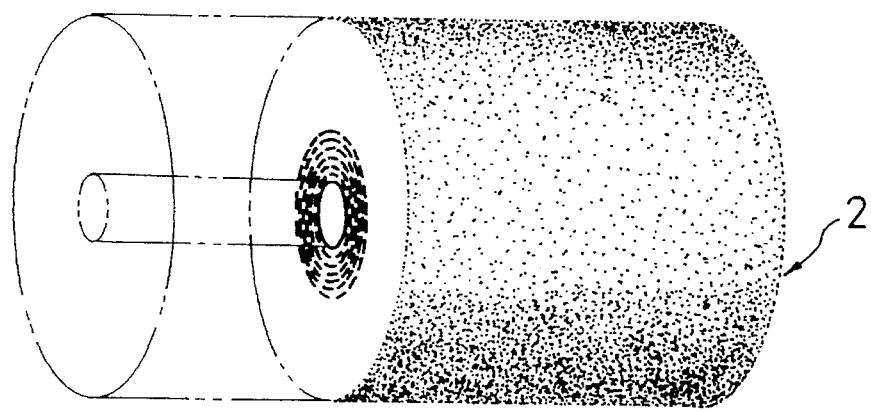
FIG. 4 is a perspective view, partly cut away, showing an example of rotary member.

The dust or flaw removing member 2 is formed, where it is used for removal of dust, in the form of a circular cylinder from fiber elements as seen from FIG. 4 and is removably held on a drive shaft 21 (refer to FIGS. 1 and 2) in the form of a rod fitted in an axial core portion of the fiber elements.

The dust or flaw removing member 2 shown in FIG. 4 is formed in a circular cylinder from buff layered in a plurality of layers and is set so that a cylindrical peripheral face of the circular cylinder functions as an effective wiping out face.

Incidentally, the buff constituting the dust or flaw removing member 2 is formed such that a circular piece of cloth cut so as to have, at the center thereof, an opening through which the drive shaft 21 is to be fitted, is layered in a large number of layers so as to have a suitable total thickness and the layers are sewn from a central portion toward the outer periphery side, for example, using a sewing machine to form a fixing portion while the outer periphery side is left as a non-sewn portion of a suitable width so that an outer peripheral face of the non-sewn portion may serve as a soft wiping out face.

It is to be noted that, upon formation of the dust or flaw removing member 2, that is, upon layering of buff into a large number of layers so as to have a circular cylindrical profile, a spacer may be suitably interposed between adjacent layers of the buff so that the softness of the cylindrical peripheral face of the dust or flaw removing member 2 which functions as an effective wiping out face may be adjusted suitably.

While the dust or flaw removing member 2 in FIG. 4 is removably held on the drive shaft 21 mentioned hereinabove, this allows replacement or repair of the dust or flaw removing member 2 when the wiping out face of the cylindrical periphery of the dust or flaw removing member 2 becomes abraded or soiled and cannot function as an effective wiping out face any more.

Accordingly, in place of the construction of the dust or flaw removing member 2 shown in FIG. 4 wherein the dust or flaw removing member 2 is removably held on the drive shaft 21, the dust or flaw removing member 2 may otherwise be formed integrally with the drive shaft 21 so that it may be replaced together with the drive shaft 21.

Further, the dust or flaw removing member 2 may alternatively be constructed so that, as shown in FIG. 5, a pipe member 22 is fitted in advance in the axial core portion thereof so that the dust or flaw removing member 2 may be readily fitted onto the drive shaft 21 under the guidance of the pipe member 22 serving as a guide hole.

In this instance, the opposite ends of the pipe member 22 are caulked so that the dust or flaw removing member 2 may have a circular cylindrical profile having a fixed shape and a self holding property.

Figure 6:
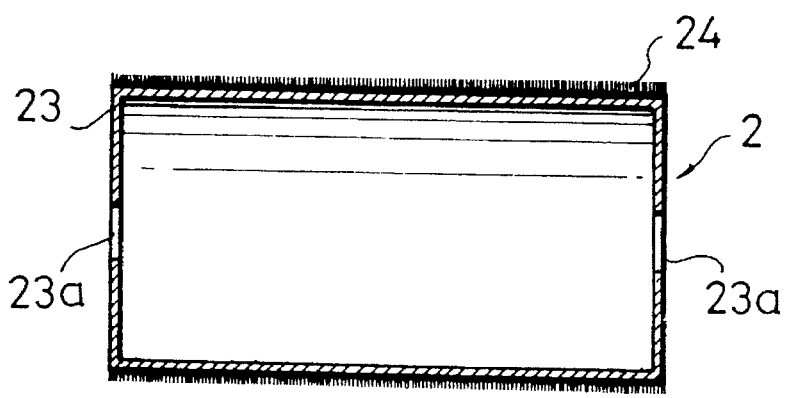
FIG. 6 is a longitudinal sectional view showing a further example of rotary member.

The dust or flaw removing member 2 may alternatively be formed in such a manner as shown in FIG. 6 wherein a wiping out member 24 formed as a sheet having raised fibers or a felt is applied to a cylindrical peripheral face of a core member 23 formed in a closed circular cylinder from aluminum and a pair of openings 23a are formed at axial core portions of the core member 23 so that the drive shaft 21 may be fitted into the openings 23a.

In this instance, reduction of the entire weight and/or reduction of the cost of the dust or flaw removing member 2 can be achieved.

The drive shaft 21 is connected to the driving source 3 which will be hereinafter described, and is held, in the embodiment shown in FIGS. 1 and 2, horizontally for rotation on a box-shaped bracket 47 disposed in the casing 4.

The drive shaft 21 has a threaded portion 21a at an end thereof which is the left end in FIGS. 1 and 2, and a nut 25 can be screwed to the threaded portion 21a to prevent letting off of the dust or flaw removing member 2 from the drive shaft 21 and to assure the dust or flaw removing member 2 to be held integrally on the drive shaft 1.

A gear 26 is provided on a base end portion of the drive shaft 21 which is a right end portion in FIGS. 1 and 2 so that, when the gear 26 is coupled to and driven to rotate by the driving source 3 which will be hereinafter described, the dust or flaw removing member 2 is driven to rotate thereby.

It is to be noted that the location of the drive shaft 21 is naturally set by the box-shaped bracket 47 so that, when the dust or flaw removing member 2 is held on the drive shaft 21, the cylindrical peripheral face of the dust or flaw removing member 2 may be resiliently contacted with the surface of the laser disk 5.

By the way, in the embodiment shown, such dust or flaw removing member 2 is disposed by a plural number, that is, by two, above and below the laser disk 5 so that the laser disk 5 may be held from the opposite face sides thereof by and between them.

The dust or flaw removing members 2 are provided such that, when the dust or flaw removing member 2 disposed on the upper face side of the laser disk 5 is rotated in its so-called wiping out direction, the other dust or flaw removing member 2 disposed on the lower face side of the laser disk 5 is rotated in the reverse direction on the opposite side of the laser disk 5.

In particular, while some of disks such as laser disks and compact disks are constructed as the single-sided type with which only one face is utilized, some other disks are constructed as the double-sided type with which two opposite faces are utilized. Thus, the cleaner apparatus in the present embodiment is constructed so that it can simultaneously remove dust or flaws on the opposite faces of a disk even of the double-sided type without turning out the disk.

Since the dust or flaw removing member 2 are resiliently contacted with the opposite faces of the laser disk 5, the laser disk 5 can be rotated with a higher degree of certainty by rotation of the dust or flaw removing members 2.

Accordingly, from the intention of the present invention, such dust or flaw removing member 2 need not necessarily be provided by a plurality number but may naturally be provided by a single number.

The driving source 3 in the present embodiment includes an electric motor held on a bracket 48 disposed on an inner bottom portion of the casing 4 and positioned within the box-shaped bracket 47. When the electric motor is energized, the drive shaft 21 fitted at the axial core portion of the dust or flaw removing member 2 is driven to rotate by the electric motor.

In particular, referring to FIG. 2, the driving source 3 is constructed such that a drive gear 32 mounted on an output shaft 31 thereof is held in meshing engagement with the gear 26 on the drive shaft 21 so as to drive the gear 26 to rotate.

It is to be noted that, where only the dust or flaw removing member 2 shown at the upper portion in FIG. 2 is provided but the dust or flaw removing member 2 shown at the lower portion in FIG. 2 is omitted, the drive gear 32 may be connected to the gear 26 on the drive shaft 21 at the upper location by way of a chain or a like transmission element or by way of the gear 26 on the drive shaft 21 at the lower location, which is rotated but in vain, while the dust or flaw removing member 2 at the lower location is merely omitted.

While the cleaner apparatus in the present embodiment is constructed in such a manner as described above, it is further constructed such that, when the surface of the laser disk 5 is to be wiped out by the dust or flaw removing member 2, the laser disk 5 can be rocked over a small angle.

In particular, the cleaner apparatus in the present embodiment includes a rocking mechanism 6 as shown in FIGS. 1 and 2. The rocking mechanism 6 includes an electric cam motor 61 disposed vertically, a cam 63 mounted on an output shaft 62 of the electric cam motor 61, and a cam follower 64 for contacting with the cam 63.

The cam follower 64 is mounted integrally on a lower face of a free end portion of the arm 1 so that it is moved by eccentric rotation of the cam 63.

Since the arm 1 is normally urged to rock in its closing direction while the dust or flaw removing member 2 which is contacted with the laser disk 5 is driven to rotate, the cam follower 64 is rocked by rotation of the cam 63 to rock the arm 1.

As a result, when the surface of the laser disk 5 is wiped out by the dust or flaw removing member 2, the rocking mechanism 6 is driven so that rocking motion of the laser disk 5 over a small angle is repeated, and consequently, a wiping out operation for the surface of the laser disk 5 is performed further uniformly.

Further, if a polishing member is disposed suitably between the surface of the laser disk 5 and the cylindrical peripheral phase of the dust or flaw removing member 2, then flaws formed on the surface of the laser disk 5 can be polished, upon such wiping out operation as described above, to remove them.

On the other hand, where the cam 63 constituting the rocking mechanism 6 and the cam follower 64 for contacting with the cam 63 are provided, the stopper 46 (refer to FIG. 1) for restricting the rocking motion of the arm 1 can be omitted.

With the cleaner apparatus of the present embodiment having the construction described above, when the arm 1 is rocked, mounting or dismounting of the laser disk 5 onto or from the arm 1 is enabled or the dust or flaw removing member 2 can be resiliently positioned adjacent the surface of the laser disk 5.

When the driving source 3 is energized while the dust or flaw removing member 2 is resilient contacted with the surface of the laser disk 5, the dust or flaw removing member 2 is rotated around the axis thereof, that is, around the drive shaft 21.

As a result, the cylindrical peripheral face of the dust or flaw removing member 2 serving as a wiping out face wipes out the surface of the laser disk 5 to remove dust sticking to the surface of the laser disk 5, and the laser disk 5 is compulsorily rotated by rotation of the dust or flaw removing member 2.

Accordingly, as the length of the dust or flaw removing member 2 is set greater than the recording width of information recorded on the laser disk 5 and the arm 1 is rocked successively over a small angle during cleaning, removal of dust on the surface of the, laser disk 5 is performed uniformly together with rotation of the laser disk 5.

In this instance, the wiping out direction by the dust or flaw removing member 2 is the resultant force direction d of the direction b of rotation of the dust or flaw removing member 2 and the direction of movement c of the laser disk 5 caused by rotation of the dust or flaw removing member 2.

The resultant force direction d is a radial direction of the laser disk 5, and accordingly, even if wiping out marks should remain on the surface of the laser disk 5, the wiping out marks will remain in radial directions of the laser disk 5. In this instance, since information is recorded in a circumferential direction on the laser disk 5, the wiping out marks mentioned above intersect merely with the circumferential information tracks of the laser disk 5. Consequently, upon reproduction of audio or video signals recorded on the laser disk 5, the obstacle of the wiping out marks in radial directions is small.

Further, where two such dust or flaw removing members 2 are provided such that the laser disk 5 are held from the opposite face sides by and between them, removal of dust is performed simultaneously from the opposite faces of the laser disk 5.

Further, if a suitable polishing material is interposed between the cylindrical peripheral face of the dust or flaw removing member 2 and the surface of the laser disk 5 or the material of the dust or flaw removing member 2 is changed to a polishing material, then the surface of the laser disk 5 can be polished, and accordingly, if fine flaws are present discretely on the surface of the laser disk 5, they can be removed from the surface of the laser disk 5. Operation and effects where polishing is performed are similar to those where removal of dust is performed. The dust or flaw removing member 2 is replaced when it becomes soiled or abraded and it cannot exhibit a predetermined wiping out or polishing function any more.

While, in the embodiment described above, the arm 1 is constructed such that it is rocked in the direction of rotation of the dust or flaw removing member 2 and holds the laser disk 5 horizontally, from the object of the present invention, the arm 1 may naturally be constructed alternatively such that it is rocked in a vertical direction or in a substantially vertical direction and the laser disk 5 is held vertically or substantially vertically.

Further, while the foregoing describes the case wherein the cleaner apparatus of the present invention is provided as a unit, from the construction of the present invention, the cleaner may naturally constitute part of some other apparatus such as, for example, an apparatus for reproducing audio or video signals recorded on a laser disk or an apparatus for storing laser disks.

As described above, according to the present invention, the following effects are achieved.

1. Dust or flaws can be removed from the surface of a disk such as a laser disk or a compact disk by a simple operation.

2. Since wiping out marks or polishing marks formed by the dust or flaw removing member extend in radial directions on the surface of the disk and such directions merely intersect with circumferential information tracks recorded on the disk, possible obstacles can be minimized upon reproduction of audio or video signals recorded on the disk.

3. Further, according to the present invention, since the dust or flaw removing member resiliently contacted with the surface of the disk is rotated to perform removal of dust or flaws and cause rotation of the disk, there is no need of separately providing means for rotating the disk, and there is an advantage in that reduction of the weight of the entire apparatus and reduction of the cost by reduction of the number of parts can be achieved.

What is claimed is:

1. A cleaner apparatus comprising:

a casing;

an arm pivotably connected at one end to said casing;

holder means connected to another end of said arm and for rotatably holding a disk;

a cylindrical cleaning member connected to said casing and positioned to resiliently contact a surface of the disk, said cylindrical cleaning member having a longitudinal axis spaced from, and substantially parallel to, a radial axis of the disk;

driving means for rotating said cleaning member about said longitudinal axis;

a cam motor positioned in said casing said cam motor having an output shaft;

a cam mounted on said output shaft;

a cam follower mounted on said arm and positioned in contact with said arm, said cam follower, said cam and said cleaning member cooperating with each other to cause rotation of said cleaning member to bias said cam follower and said arm against said cam, said cam motor rotating said output shaft to rotate said cam, rotation of said cam causing a force against said cam follower substantially opposite to said bias caused by said cleaning member, said cam and said cam follower cooperating to cause said force to move said cam follower and said arm to pivot about said one end of said arm connected to said casing, pivot movement of said arm moving the disk connected to said holder means in a rocking movement against said cleaning member to perform a wiping out operation on the disk.

2. An apparatus in accordance with claim 1, further comprising:

means for pivoting said arm about an axis substantially parallel to an axial axis of the disk.

3. An apparatus in accordance with claim 1, wherein:

said cleaning member is formed from a plurality of layers of cloth.

4. An apparatus in accordance with claim 3, wherein:

said layers of cloth are substantially circular and have an outer periphery side, said layers of cloth being sewn from a central portion toward an outer periphery to form a fixing portion with said outer periphery side of said layers of cloth being not sewn.

5. An apparatus in accordance with claim 1, wherein:

said driving means includes a shaft;

said cleaning member is mounted on a pipe and said pipe is designed to be repetitively mounted on said shaft of said driving means.

6. An apparatus in accordance with claim 1, wherein:

said driving means includes a shaft;

said cleaning member includes a sheet mounted on a core member, said core member defining openings at axial core portions of said core member for repetitive mounting on said shaft of said driving means.

7. An apparatus in accordance with claim 1, further comprising:

another cylindrical cleaning member connected to said casing and positioned to resiliently contact another surface of the disk, said another cylindrical cleaning member having a longitudinal axis spaced from, and substantially parallel to, said radial axis of the disk.

8. An apparatus in accordance with claim 1, wherein:

said cleaning member includes polishing materials for polishing the surface of the disk.

9. An apparatus in accordance with claim 1, wherein:

said holder means is fitted into a center opening of the disk said cleaning member is positioned eccentrically with respect to the disk.

10. An apparatus in accordance with claim 1, wherein:

said driving means rotates the disk through rotation of said cleaning member and said resilient contact between said cleaning member and the disk.

11. An apparatus in accordance with claim 10, wherein:

said driving means rotates said cleaning member about said longitudinal axis of said cleaning member and rotates the disk about an axial axis of said disk to remove particles from the disk in a radial direction of the disk.

12. An apparatus in accordance with claim 1, wherein:

the disk is a standard optical disk and said cleaning member extends over all readable portions of the disk during rotation of the disk.

* * * * *